United States Patent
Moss

(10) Patent No.: US 9,583,967 B2
(45) Date of Patent: Feb. 28, 2017

(54) RUGGEDIZED PRESSURE TRANSDUCER WITH INTEGRATED WIRELESS ANTENNA AND RECHARGEABLE BATTERY SYSTEM

(71) Applicant: Dwyer Instruments Inc., Michigan City, IN (US)

(72) Inventor: Robert Austin Moss, Saint Joseph, MI (US)

(73) Assignee: Dwyer Instruments, Inc., Michigan City, IN (US)

( * ) Notice: Subject to any disclaimer, the term of this patent is extended or adjusted under 35 U.S.C. 154(b) by 158 days.

(21) Appl. No.: 14/518,324

(22) Filed: Oct. 20, 2014

(65) Prior Publication Data

US 2015/0128714 A1    May 14, 2015

Related U.S. Application Data

(60) Provisional application No. 61/892,897, filed on Oct. 18, 2013.

(51) Int. Cl.
| | |
|---|---|
| *G01L 9/04* | (2006.01) |
| *H02J 7/02* | (2016.01) |
| *G01L 19/06* | (2006.01) |
| *G01L 19/08* | (2006.01) |
| *G01L 5/00* | (2006.01) |

(52) U.S. Cl.
CPC ............ *H02J 7/025* (2013.01); *G01L 5/0052* (2013.01); *G01L 19/0609* (2013.01); *G01L 19/086* (2013.01)

(58) Field of Classification Search
USPC .......................................................... 73/726
See application file for complete search history.

(56) References Cited

U.S. PATENT DOCUMENTS

| | | | | |
|---|---|---|---|---|
| 3,262,090 | A * | 7/1966 | Farmer | B63B 22/003 367/4 |
| 4,157,528 | A * | 6/1979 | Shuck | E21B 43/26 338/3 |
| 2013/0304385 | A1* | 11/2013 | Gillette, II | G01N 33/0009 702/6 |
| 2014/0102708 | A1* | 4/2014 | Purkis | E21B 43/26 166/308.1 |

* cited by examiner

*Primary Examiner* — Clayton E Laballe
*Assistant Examiner* — Warren K Fenwick
(74) *Attorney, Agent, or Firm* — Tarolli, Sundheim, Covell & Tummino LLP

(57) ABSTRACT

A pressure transducer for a hammer union installation includes a lower body capable of withstanding the stresses of the hammer union installation. The lower body includes a cylindrical wall, a diaphragm, and a pressure port for exposing the diaphragm to pressure. The pressure transducer also includes one or more transducer elements mounted on the diaphragm that are operable to provide a signal related to pressure. A cap is received by the cylindrical wall and is slidable along the wall. The cap includes comprising an antenna for transmitting the signal. A spring is arranged in the lower body for dampening forces applied to the cap.

11 Claims, 3 Drawing Sheets

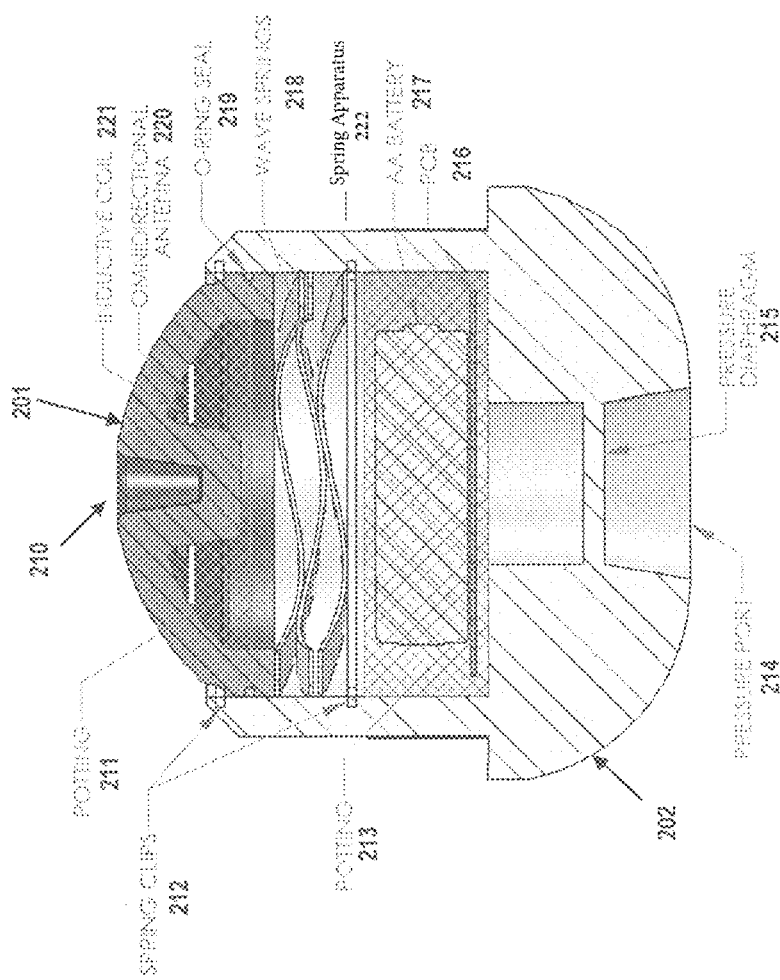
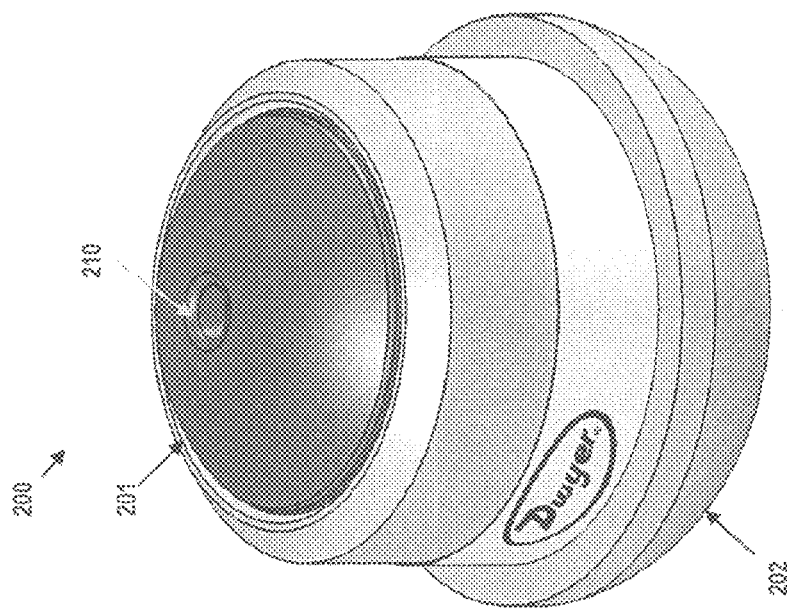
FIG. 2B
FIG. 2A

RUGGEDIZED PRESSURE TRANSDUCER WITH INTEGRATED WIRELESS ANTENNA AND RECHARGEABLE BATTERY SYSTEM

RELATED APPLICATION

This application claims the benefit of U.S. Provisional Application Ser. No. 61/892,897, which was filed on Oct. 18, 2013, the contents of which are hereby incorporated by reference in its entirety.

TECHNICAL FIELD

The present disclosure is directed to ruggedized pressure transducers having integrated wireless communication. More specifically, the present disclosure is directed to high pressure measurement apparatuses, such as hammer union transducers configured to withstand harsher-than-normal physical and/or environmental conditions. Additionally, the present disclosure includes configurations for wirelessly transmitting measurements from within measuring environments.

BACKGROUND INFORMATION

Certain operations, such as hydraulic fracturing (or "fracking"), cementing, and/or acidizing, require high pressure measurement apparatuses with specialized hammer union transducers. In the case of fracking, a well is typically drilled vertically to a desired depth, then turned approximately ninety degrees to continue horizontally for several thousand feet into the shale believed to contain minerals such as natural gas and oil. A mix of water, sand, and various chemicals may be pumped into the well at high pressure in order to create fissures in the shale through which the gas/oil can escape. Typically, natural gas and oil escape through the fissures and is drawn back up the well to the surface, where it is processed, refined, and shipped to market.

As is known in the art, fracking operations are temporary, heavy construction sites, where pressure transducers are mounted in high traffic areas and currently require cables in certain cases to transmit pressure information back to an instrument truck or similar installation. These cables are often damaged during operation, causing disruptions to the operations. Furthermore, the transducers are typically provided in a hammer union (or "wing union") configuration and may be installed with a sledge hammer, which may cause extreme shock and/or vibration to the transducer. Even glancing blows to the transducer during installation may cause damage, particularly to encasings and/or the underlying circuitry.

SUMMARY

Accordingly, under one exemplary embodiment, a transducer is disclosed comprising a curved cap assembly, coupled to a lower portion of the transducer, said curved cap assembly comprising an antenna; a spring assembly arranged in the lower portion beneath the cap assembly, said spring assembly being configured to enable dampening of force applied to the curved cap assembly; and a circuit, arranged in the lower portion, said circuit being configured to receive and process data being transduced by the transducer and transmit the processed data to the antenna.

Under another exemplary embodiment a transducer is disclosed comprising a curved cap assembly, coupled to a lower portion of the transducer, said curved cap assembly comprising an inductive port and an antenna; a spring assembly arranged in the lower portion beneath the cap assembly, said spring assembly being configured to enable dampening of force applied to the curved cap assembly; a battery, configured in the lower portion; and a circuit, arranged in the lower portion and coupled to the battery, said circuit being configured to (a) receive and process data being transduced by the transducer and transmit the processed data to the antenna, and (b) provide electromagnetic energy received from the inductor to the battery.

BRIEF DESCRIPTION OF THE DRAWINGS

The present invention is illustrated by way of example and not limitation in the figures of the accompanying drawings, in which like references indicate similar elements and in which:

FIG. 2A illustrates an outer perspective view of a ruggedized transducer that includes an inductive charging configuration under one exemplary embodiment;

FIG. 2B illustrates a side cutaway view of the ruggedized transducer of FIG. 2A.

DETAILED DESCRIPTION

Figures 1A, 1B:
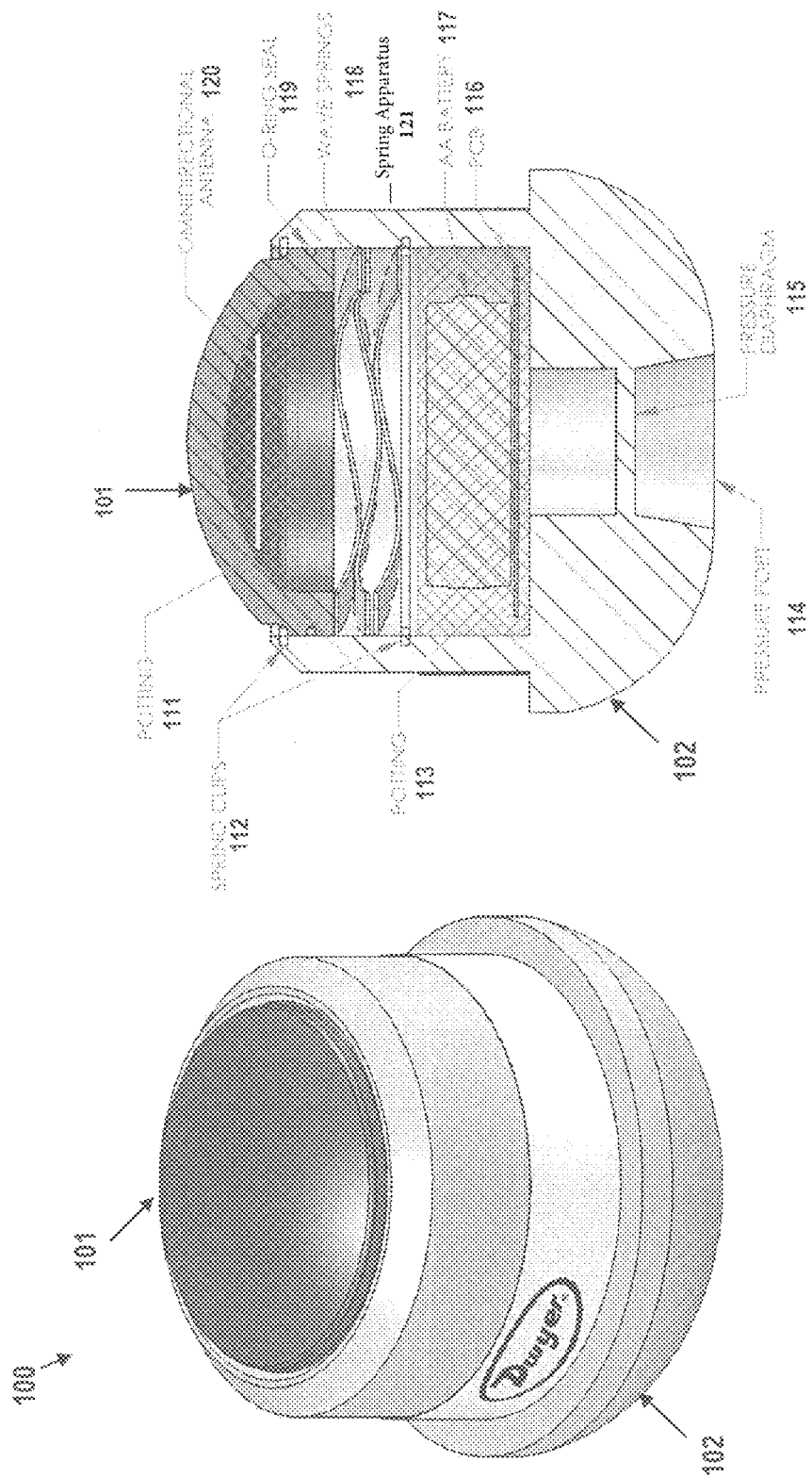
FIG. 1A illustrates an outer perspective view of a ruggedized transducer under one exemplary embodiment.
FIG. 1B illustrates a side cutaway view of the ruggedized transducer of FIG. 1A.

FIG. 1A illustrates an exemplary embodiment of a ruggedized transducer 100 comprising a lower body 102 and a cap 101. Cap 101 is preferably produced from a polybutylene terephtalate (PBT) and polycarbonate (PC) blend (PBT/PC), which is compliant with required regulations in the fracking application, although other equivalent materials having relatively high impact resistance may be used as well. For additional strength, other additives, such as an ethylene/N-butyl acrylate/glycidyl methacrylate copolymer (PTW) or Acrylonitrile butadiene styrene (ABS) may be used with the PBT/PC to further strengthen cap 101. Lower body 102 may be made from a high strength metal suitable for the harsh environment of the fracking operation and capable of withstanding the stresses from the hammer union installation. FIG. 1B illustrates a side cutaway view of transducer 200 discussed above in connection with FIG. 1A. As can be seen from FIG. 1B, cap 101 may be insertably mated with lower body 102 and preferably held in pace utilizing spring clips 112. O-ring seal 119 is also preferably used to form an environmental seal between cap 101 and lower body 102 wall. As cap 101 is made from an engineered plastic/polymer, it is suitable for housing an antenna 120 within the internal cap area. In a preferred embodiment, antenna 120 is an omnidirectional antenna in order to transmit or receive radio waves in all directions equally, although other forms of antennas (e.g., directional) may be utilized as well. Antenna 120 is configured to be communicatively coupled to circuit board 116, via wired or wireless connection, in order to communicate measurements and/or data to/from transducer 100.

For additional protection, at least a portion of the internal cavity of cap 101 is filled with a potting compound 111. In a preferred embodiment, a cure-in-place potting compound, comprising a low loss, low dielectric material, may be poured over antenna 120. Potting compound 111 should be a low dielectric material that is substantially non-conductive and in order to minimize interference to antenna operation. Alternately or in addition, foams such as polyisocyanurate and polyurethane pour foams and spray foams have been found to have advantageous non-conductive properties for electronic potting of antennas and have particularly good shock/blast resistance. After potting, the cavity of cap 101 may be enclosed and sealed with a bottom lid as shown in FIG. 1B to form a cap enclosure.

Cap enclosure 101 may be designed to slide circumferentially into the transducer lower body 102 and is held in place with spring clips 112 and provided with environmental sealing via 0-ring 119 and may include one or more snap rings. In order to provide advantageous protection against shock, impact and/or vibration, cap enclosure 101 is positioned over a spring apparatus 121 to provide dampening. In the embodiment of FIG. 1B, the spring apparatus 121 comprises one or more wave springs 118, where an upper snap ring may be configured to restrain the cap inside the body and a preloaded, high force wave spring holds the cap against the upper snap ring. The preload on the wave spring may be maintained by a lower snap ring. Accordingly, the spring preload and cap are configured to absorb the energy of (accidental) glancing blows from a hammer or other impact/shock experienced during installation. Due to the advantageous shape of the cap, any impact will slide against the force of the spring to absorb the impact of the hammer and allow the hammer to slide over the curved surface of the cap to minimize any damage to the antenna inside. The potting 111 within the cap would provide an additional level of protection. Under a preferred embodiment, it is desirable to keep the profile of the upper transducer and cap as low as possible to reduce the risk of accidental impact by hammers used during the installation process.

The transducer lower body of FIG. 1B also includes a processing and communications circuit 116 that is preferably embodied as a printed circuit board (PCB). Power for the circuit 116 (as well as antenna 120) is provided by battery 117. In one embodiment, battery 117 may be a conventional IEC-LR6 battery. In another embodiment, battery 117 incorporates Lithium Thionyl Chloride chemistry since it has the highest energy density, longest shelf life, and widest working temperatures that are commercially viable. Battery cells may be assembled into a battery module for greater protection.

Circuit board 116 should preferably be IEEE 802.15.4 compliant and comprises a wireless sensor network processing card that includes a power management module and a serial interface module responsible for handling flow control of serial data network data and error correction. Board 116 is preferably controlled by a processor (e.g., ARM Cortex-M3 microprocessor) equipped with an intelligent networking platform that controls transmit/receive packets via a packet queue or memory. Board 116 is also equipped with a wireless communication module that includes RF control for managing ingoing/outgoing communication. It should be understood by those skilled in the art that, while board 116 is described in terms of a printed circuit board, other suitable technologies, such as system on a chip (SoC) or system in package (SiP) may be applied as well without deviating from the spirit and scope of the present disclosure.

Similar to the cap enclosure 101, the bottom of transducer lower portion 102 that contains the circuit board 116, and even battery 117, may be encased in a potting compound 113 for additional physical protection. While the lower potting 113 may be similar to potting 111, care must be taken during an assembly process to ensure that circuit board 116 is not adversely affected during assembly and/or operation. It is possible for circuit board 116 to have elevated heat levels during operation. Therefore, depending on the ultimate application, the potting compound material should not amplify circuit board heating. Preferably, the potting compound material should dissipate the heat; thus thermally conductive potting compounds may be advantageous. Alternately, heat sinks may be employed, in combination with the potting compound, to provide maximum protection while optimizing heat dissipation from the circuitry.

During operation, transducer 100 obtains pressure measurements from pressure port 114 via pressure diaphragm 115. Diaphragm 115 develops compressive and tension stain on the inside surface of the diaphragm which is detected by a strain measuring device, such as a strain gage, can converted to an electrical signal. These measurements are then processed in circuit board 116 and transmitted to antenna 120 for external transmission. In one embodiment, antenna 120 may receive system data and/or data from other transducers and process/forward this data as needed. Further discussion of system communication may be found in the embodiment of FIG. 3, below.

Turning to FIG. 2A, another exemplary embodiment is provided wherein transducer 200, which otherwise is similar to the embodiment of FIGS. 1A-B, is provided with an inductive charging apparatus for battery 217. FIG. 2A illustrates an exemplary embodiment of a ruggedized transducer 200 comprising a lower body 202 and a cap 201, just as in FIG. 1A, except that an inductive charging port 210 is provided in the cap. One advantage of this embodiment is that the user is enabled to recharge the re-chargeable batteries (217) with an external induction charging system through the polymer cap 201 without disassembling the transducer. The transducer is an intrinsically safe rated device for hazardous locations and disassembly by external parties to replace batteries is not desirable from a safety or liability standpoint. As shown in FIGS. 2A-B, an inductive port is configured as an indent (210) in the cap to receive an external induction power source.

FIG. 2B illustrates a side cutaway view of transducer 200 discussed above in connection with FIG. 2A, and is, unless stated otherwise, identical in configuration and construction relative to FIG. 1B. Again, cap 201 may be insertably mated with lower body 202 and preferably held in pace utilizing spring clips 212. O-ring seal 219 is also preferably used to form an environmental seal between cap 201 and lower body 202 wall. Cap 201 houses an antenna 220 within the internal cap area, as well as inductive coil 221. Inductive coil 221 is operatively coupled to battery 217 in order to enable inductive charging by using electromagnetic fields to transfer energy from a charging device (i.e., inductive power source) inserted into port 210. Energy is sent through an inductive coupling to a charger, which may be integrated or connected to circuit board 217, or alternately integrated with battery 217, which can then use that energy to charge battery 217. The inductive charging would comprise forming an alternating electromagnetic field from within the inductive power source, which is revived at inductive coil 221 which takes power from the electromagnetic field and converts it back into electrical current to charge battery 217. In a sense, the two induction coils in proximity through port 210 combine to form an electrical transformer.

As in FIG. 1B, antenna 220 of FIG. 2B is preferably an omnidirectional antenna and is configured to be communicatively coupled to circuit board 216, via wired or wireless connection, in order to communicate measurements and/or data to/from transducer 200. Again, at least a portion of the internal cavity of cap 201 is filled with a potting compound 211, similar to potting 111. Cap enclosure 201 may be designed to slide circumferentially into the transducer lower body 202 and is held in place with spring clips 212 and provided with environmental sealing via O-ring 219 and may include one or more snap rings. In order to provide advantageous protection against shock, impact and/or vibration, cap enclosure 201 is positioned over a spring apparatus 222 to provide dampening, similar to the embodiment of FIG. 1B. Likewise, the transducer lower body of FIG. 2B also includes a processing and communications circuit 216 and battery 217, encased in potting compound 213. The configuration of FIG. 2B provides the same advantages as those discussed above in FIG. 1B, and further provides the advantage of enabling convenient battery charging that does not require disassembly of the transducer.

Figure 3:
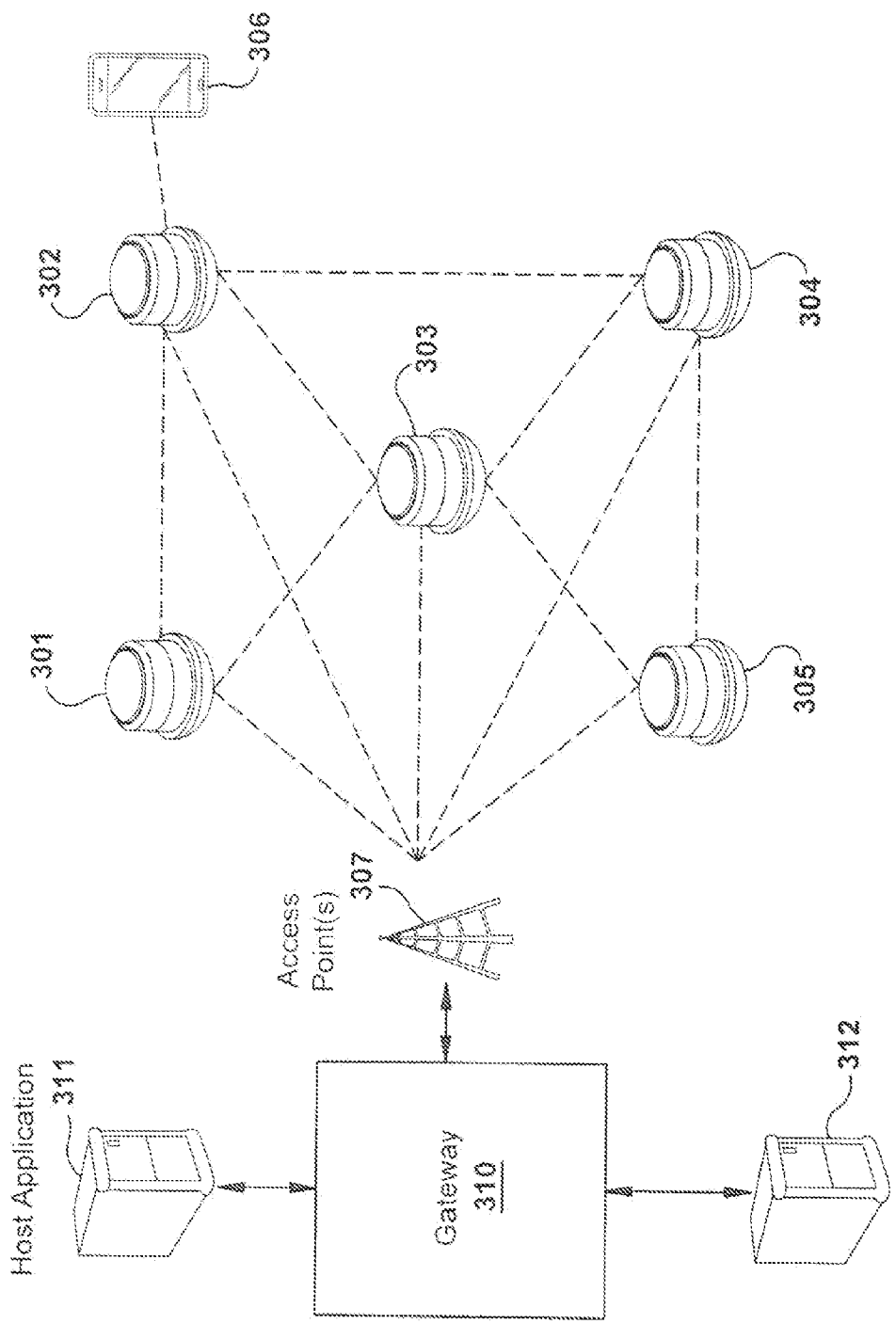
FIG. 3 illustrates a network system utilizing wireless transducer measurements and/or communications under one exemplary embodiment.

Turning to FIG. 3, and exemplary embodiment is provided wherein the wireless transmitters having any of the configurations described above are arranged in a wireless network system. Under a preferred embodiment, the transmitters communicate using a WirelessHART protocol, which is a wireless network communications protocol for process automation applications. Under this embodiment, the protocol adds wireless capabilities to the HART Protocol while maintaining compatibility with existing HART devices, commands, and tools that may be used in the system. The WirelessHART standard supports multiple messaging modes including one-way publishing of process and control values, spontaneous notification by exception, ad-hoc request/response, and auto-segmented block transfers of large data sets. These capabilities allow communications to be tailored to application requirements thereby reducing power usage and overhead The system of FIG. 3 comprises wireless field devices connected to process or plant equipment. In this example, the wireless field devices comprise the ruggedized wireless transducers (301-305) described above in connection with FIGS. 2A-B communicating through a WirelessHART-enabled PCB 216 or via a WirelessHART adapter connected to PCB 216. Transducers 201-305 may communicate to one or more access points 307, as well as with each other. Depending on the configuration needed, transducers 301-305 may be arranged in a point-to-point, bus, star, ring, mesh, tree, daisy-chain, or any other suitable network topology. Transducers 301-305 may also be configured to communicate with wireless handheld devices 306 as well.

Gateway 310 is communicatively coupled to access point 307 and enables communication between communicating devices and host applications 311 connected to a high-speed backbone or other existing plant communications network. Gateway 310 may include (or be separately coupled to) a network manager for configuring the network, scheduling communications between devices, managing message routes, and monitoring network health. The Network Manager can be integrated into the gateway, host application, or process automation controller 312, and may determine redundant routes based on latency, efficiency and reliability. To ensure the redundant routes remain open and unobstructed, messages may continuously alternate between the redundant paths. Consequently, if a message is unable to reach its destination by one path, it may be automatically re-routed to follow a known-good, redundant path with little to no loss of data. Because these transducers are also used as safety devises, the gateway must also alarm if any transducer ceases to transmit signals.

Under a preferred embodiment, the network uses IEEE 802.15.4 compatible radios operating in the 2.4 GHz Industrial, Scientific, and Medical radio band. The radios may employ direct-sequence spread spectrum technology and channel hopping for communication security and reliability, as well as TDMA synchronized, latency-controlled communications between devices on the network. This technology is particularly advantageous in plant installations across a broad range of process control applications.

When arranged as a mesh network, each transducer 301-305 may serve as a router for messages from other devices. Under this configuration, transducers do not have to communicate directly to gateway 310, and may forward one or more messages to the next closest transducer. This configuration is advantageous for extending the range of the network and provides redundant communication routes to increase reliability. Furthermore, a mesh configuration eases the process of adding or moving transducers in the network, as long as a transducer is within range of others in the network.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A pressure transducer for a hammer union installation, comprising:
    a lower body capable of withstanding the stresses of the hammer union installation, the lower body comprising a cylindrical wall, a diaphragm, and a pressure port for exposing the diaphragm to pressure;
    one or more transducer elements mounted on the diaphragm, the transducer elements being operable to provide a signal related to pressure;
    a cap for being received by the cylindrical wall and being slidable along the wall, the cap comprising an antenna for transmitting the signal; and
    a spring apparatus arranged in the lower body for dampening forces applied to the cap.

2. The pressure transducer recited in claim 1, further comprising a circuit and a battery for powering the circuit, the circuit being configured to receive and process signals from the transducer elements and to transmit pressure data via the antenna.

3. The pressure transducer recited in claim 2, further comprising an inductive coil for charging the battery.

4. The pressure transducer recited in claim 3, wherein the coil is housed in the cap.

5. The pressure transducer recited in claim 4, wherein the cap comprises a port for receiving an external inductive charging system.

6. The pressure transducer recited in claim 1, wherein the antenna is supported in an internal cavity of the cap by a potting material.

7. The pressure transducer recited in claim 6, wherein the potting material comprises at least one of polyisocyanurate foam and a polyurethane foam.

8. The pressure transducer recited in claim 1, wherein the spring apparatus comprises one or more wave springs.

9. The pressure transducer recited in claim 1, wherein the cap is constructed of a polybutylene terephtalate (PBT) and polycarbonate (PC) blend (PBT/PC).

10. The pressure transducer recited in claim 9, wherein the materials used to construct the cap further comprises as an additive at least one of ethylene/N-butyl acrylate/glycidyl methacrylate copolymer (PTW) and Acrylonitrile butadiene styrene (ABS).

11. The pressure transducer recited in claim 1, wherein the transducer elements comprise strain gauge elements.

* * * * *